3,063,977
PROCESS FOR PRODUCING COPOLYMERS OF POLYVINYLCHLORIDE
Robert S. Holdsworth, Needham, and William Mayo Smith, Wellesley Hills, Mass., assignors to Escambia Chemical Corporation, Pace, Fla., a corporation of Delaware
No Drawing. Filed Mar. 26, 1958, Ser. No. 723,950
9 Claims. (Cl. 260—87.5)

This invention relates to the production of copolymers or interpolymers and more particularly to the production of copolymers of vinyl chloride and a mono-isoolefin such as isobutylene.

A principal object of the present invention is to provide a suspension polymerization process for producing copolymers of vinyl chloride and a mono-isoolefin.

Another object of the invention is to provide a suspension polymerization process for producing copolymers of vinyl chloride and isobutylene.

Still another object of the invention is to provide a process for producing vinyl chloride-mono-isoolefin copolymers having an unusually large particle size.

Still another object of the invention is to provide vinyl chloride-mono-isoolefin copolymers of a substantially uniform particle size.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description.

The copolymerization of vinyl chloride and a mono-isoolefin such as isobutylene is illustrated in U.S. Patents 2,379,292 and 2,531,196, and thus well known. However, in these references, mixtures of vinyl chloride and isobutylene are copolymerized under emulsion conditions which results in copolymers of small particle size.

In emulsion polymerization, relatively large amounts of emulsifiers, wetting agents and catalysts are employed. The polymer particles produced are of very fine size and remain dispersed in the polymerization medium. An additional step such as coagulation or spray-drying is required to recover such dispersed polymer. The wetting agents and catalysts are frequently left mixed with the polymer, resulting in deterioration of such physical properties as heat resistance and electrical resistivity. The process of the present invention is particularly directed to a suspension polymerization wherein the copolymers produced are of a generally large and uniform size not heretofore achieved by emulsion methods. Additionally, the present suspension copolymerization is carried out under conditions wherein reaction times much shorter than those previously reported are achieved.

The copolymers produced according to the present suspension polymerization possess low softening points, excellent solubility in common, low cost solvents, excellent clarity and ease of processing. The copolymers, such as polyvinyl chloride can be calendered into sheets or films where good clarity and transparency is required, or used for coatings or impregnation of articles, for moldings, or for the production of extrusion articles such as rods, tubes and the like. The present copolymers are suited for many applications where polyvinyl chloride is not, e.g. where good processing characteristics at very low mill, calender, internal mixer or extruder, temperatures, i.e. 250° F. and good solubility in common solvents is required. Additionally as isobutylene is actually cheaper than vinyl chloride, the copolymers of the present invention are potentially less expensive than the homopolymer, polyvinylchloride. The present invention accomplishes an economical, commercial process for the copolymerization of vinyl chloride with certain mono-isoolefins.

The process of the present invention comprises copolymerizing vinyl chloride with a mono-isoolefin containing less than 8 carbon atoms at a pH below about 7.0 while dispersed in an aqueous medium containing a polymerization catalyst, a salt of a metal selected from the group consisting of magnesium, calcium, strontium, zinc, cadmium, barium, aluminum, tin, lead, antimony, titanium, and zirconium, and a surface active agent selected from the group consisting of the salts of organic sulfonates and organic sulfates. The process of the present invention is particularly well adapted to the copolymerization of vinyl chloride with isobutylene.

Surface active agents as mentioned above have been employed both in emulsion and suspension polymerizations. However, the use of such agents often results in a polymer of very small particle size. Likewise many metallic polyvalent salts have been utilized in producing polymers of vinyl compounds. In the prior art metallic salts have been utilized as (a) buffers, (b) coagulants and (c) stabilizers. Many inorganic or metallic salts have been used in the prior art to stabilize the pH of the polymerizing system. Likewise metallic salts have also been extensively employed to coagulate the polymer latex produced by emulsion polymerization techniques. Incorporation of various metallic salts into plasticized masses of polymers of vinyl compounds affect the heat, light, and electrical properties of the polymer. However, these metallic stabilizers usually constitute an after treatment of the produced polymer. The present invention is the first to recognize that the use of metallic salts and surface active agents at a pH below about 7.0 in a suspension copolymerization of vinyl chloride and a mono-isoolefin result in the production of copolymers of a substantially large uniform size.

Specific detailed methods of practicing the present invention are set forth in the following non-limiting examples.

EXAMPLE I

A mixture of 95 parts by weight of vinyl chloride, 5 parts of isobutylene, 200 parts of demineralized water, 0.3 part of lauroyl peroxide, 0.05 part of Ultrawet DS (alkyl benzene sodium sulfonate) and 0.15 part of calcium chloride was charged to a 28 ounce glass bottle and polymerized with agitation for 24 hours at 60° C. The copolymer produced after separating from the aqueous phase was washed and dried.

Mixtures of 92.5 and 90 parts by weight of vinyl chloride with 7.5 and 10 parts by weight respectively of isobutylene were also copolymerized as above. As increased isobutylene in the charge tends to retard the polymerization rate, the lauroyl peroxide was increased to 0.5 and 0.7 parts respectively. As a control, 100 parts of vinyl chloride was also polymerized without any isobutylene using 0.2 part lauroyl peroxide.

In each case, a polymer having a large and uniform particle size was obtained as shown by the screening analysis below:

| | | | | |
|---|---|---|---|---|
| Parts vinyl chloride charged | 100 | 95 | 92.5 | 90 |
| Parts isobutylene charged | | 5 | 7.5 | 10 |
| Parts lauroyl peroxide charged | 0.2 | 0.3 | 0.5 | 0.7 |
| Conversion, percent | 97 | 91 | 88 | 84 |
| pH–H₂O phase | 3.2 | 3.3 | 3.4 | 3.4 |
| Percent vinyl chloride bound | 100 | 96 | 94 | 92 |
| Percent isobutylene bound | 0 | 4 | 6 | 8 |
| Relative Viscosity (1% in cyclohexanone @ 25° C.) | 1.98 | 1.42 | 1.32 | 1.27 |
| | | Percent | | |
| Screening Analysis: | | | | |
| Retained on 40 mesh screen | 100 | 93 | 87 | 84 |
| Retained on 80 mesh screen | 0 | 7 | 12 | 16 |

All the copolymers could be dissolved in acetone or acetone-toluene mixtures and these solutions were water-white. The 90/10 vinyl chloride isobutylene copolymer was most soluble, yielding low viscosity solutions containing over 25% solids. The homopolymer was not soluble.

The copolymers could be milled at low temperatures, e.g. 220° F. to yield smooth sheets, while higher temperatures e.g. 300–350° F. were required for the homopolymer of vinyl chloride and the resulting sheets were rough.

EXAMPLE II

A mixture of 95 parts by weight of vinyl chloride, 5 parts of isobutylene, 200 parts of demineralized water, 0.3 part of Ultrawet DS, 0.15 part of calcium chloride and 0.05 part of Triton X–45 (an alkyl aryl polyether alcohol) was polymerized for 24 hours at 60° C. A 91% conversion was obtained.

The addition of the polyether alcohol improved the solution characteristics of the resin; there were no gel particles and the solution was more fluid. Milled sheets also contained fewer gel particles or fisheyes.

EXAMPLE III

Mixtures of 95 parts by weight of vinyl chloride, 5 parts of isobutylene, 0.1 parts Aerosol OT (dioctyl sodium sulfosuccinate), 0.1 part of barium acetate and the catalysts indicated below were polymerized for 16 hours at 60° C. The results of these runs are given below.

| Catalyst | Conversion, Percent | pH | Screening Analysis, Percent | |
|---|---|---|---|---|
| | | | On 40 Mesh | On 80 Mesh |
| Lauroyl Peroxide | 90 | 5.6 | 99 | 1 |
| Myristoyl Peroxide | 88 | 5.8 | 99 | 1 |
| Caprylyl Peroxide | 92 | 5.4 | 98 | 2 |
| Benzoyl Peroxide | 89 | 5.2 | 98 | 2 |
| Azodiisobutyronitrile | 94 | 5.2 | 99 | 1 |

EXAMPLE IV

Polymerizations may be made at lower temperatures by using an activator (sodium bisulfite). A mixture of 95 parts by weight of vinyl chloride, 5 parts of isobutylene, 0.4 part of lauroyl peroxide, 0.5 part of Ultrawet DS, 0.3 part of monobasic calcium phosphate and 0.1 part of sodium metabisulfite were polymerized for 24 hours at 50° C. A conversion of 90% was obtained, compared to a conversion of 83% for the same run without the bisulfite. In each case a resin as shown in the screening analysis of Example I was prepared.

As clearly illustrated in the examples, the present invention produces substantially uniform large size copolymers which are chemically and physically homogeneous. This is achieved only by the use in combination of a novel stabilizing system and a pH below 7.0. Although the particle size is larger than conventional, the polymers process easily and they readily absorb plasticizer when preblended at room temperature to yield a dry mixture. Resin made with the polyether alcohol (Example II) are especially absorptive of plasticizers.

The copolymers readily dissolve in organic solvents such as cyclohexanone and tetrahydrofuran, while heat is usually required to dissolve conventional vinyl chloride resins. In addition, the copolymers are dust free, and handling losses are low as compared with dust-like or powder resins. The present copolymers present fewer fabrication problems, whereas the fine powdery type presents many difficulties.

The stabilizing system is comprised of (a) a surface-active agent selected from the group consisting of the salts of organic sulfonates and organic sulfates and (b) a salt of a polyvalent metal selected from the group consisting of magnesium, calcium, strontium, zinc, cadmium, barium, aluminum, tin, lead, antimony, titanium, and zirconium. In general, it is found that the anionic surface active agents such as organic sulfate or sulfonate salts are more desirable to use with the selected metal salt to produce the desired polymer.

The use of either a salt of an organic sulfate or sulfonate alone as the dispersing agent produce agglomerated polymers. The use of other surface active agents such as fatty acid salts also result in flocculated or agglomerated products. Examples of suitable surface-active agents include high molecular sulfate salts and mono- and dialkyl substituted aryl hydrocarbons such as the alkyl naphthalene sulfonic acids, diisobutyl naphthalene sodium sulfonate, decyl benzene, sodium sulfonate, sodium disulfonate of dibutyl phenyl phenol, isopropyl naphthalene sodium sulfonate, dioctyl sodium sulfosuccinate, sodium lauryl sulfate, sodium tetradecyl sulfate, sodium pentadecyl sulfate, sodium octyl sulfate, as well as others of the above type which are well known. In place of sodium other salts may be used, for example, the potassium, ammonium or lithium salts.

The amount of surface-active agent used is desirably maintained between about 0.02 to about 0.20 part of every 100 parts of polymerizable compound employed. In determining the amount to be employed in any particular run, the amount of preferred metallic salt must be also considered.

In addition to the surface-active agent, the polymerization stabilizing system also comprises a salt of a polyvalent metal selected from the group consisting of magnesium, calcium, strontium, zinc, cadmium, barium, aluminum, tin, lead, antimony, titanium and zirconium. Examples of suitable metallic salts are calcium acetate, calcium chloride, cadmium acetate, cadmium sulfate, barium acetate, lead acetate, magnesium sulfate, zinc sulfate, aluminum phosphate, titanium sulfate, zirconium sulfate and the like. Alkali metal salts such as sodium acetate resulted in agglomerated products. The combination of a preferred metal salt with a salt of an organic sulfate or sulfonate results in an entirely novel type of stabilizing system for the polymerization of vinyl chloride with a monoisoolefin.

Although the wetting efficiency of, for example, the alkali metal organic sulfates and sulfonates, is somewhat reduced by the presence of the preferred metallic salts, the production of a resin with large, uniform particle size is obtained by a careful control of the amounts of each component of the stabilizing system. The amount of metallic salt used is desirably maintained between about 0.02 and about 0.20 part for every 100 parts of polymerizable compounds employed. The particular amounts of each component of the stabilizing system used is quite critical. Amounts of surface-active agents much in excess of those shown result in the production of a polymer of a very small particle size. Amounts of surface-active agent and metallic salt below those shown result in agglomerated polymers.

Not only must the above-mentioned stabilizing system be employed to obtain the desired size polymer, but also the polymerization must be carried out at a pH below 7.0 and preferably below about 6.5. Polymerizations carried out at a pH above about 7.0, even in the presence of the preferred stabilizing system, resulted in agglomerated resins. For purposes of adjusting the pH of the polymerization system such acids as phosphoric, acetic, hydrochloric, sulfuric and the like can be used.

Polymerization temperatures of between about 30° C. and 70° C. have been found to be most suitable. The polymerization time varies considerably depending upon such factors as the temperatures employed, catalysts, amounts of catalyst, etc. The polymerization is generally continued until substantially complete or until more than about 80% of the polymerizable compounds are converted to polymer. The completion of the polymerization is indicated by a pressure drop in the reactor. The reaction times are usually in excess of 12 hours when conducted at 50° C. The pressure employed must be sufficient to maintain the polymerizable compounds in the liquid phase while dispersed in the aqueous medium. The polymerization is preferably carried out in an atmosphere substantially free of oxygen or air.

Organic peroxides, azo compounds, redox systems and the like can be used in the present process as catalysts. Suitable organic peroxides are lauroyl peroxide, benzoyl peroxide, chlorobenzoyl peroxide, caprylyl peroxide, myristoyl peroxide, acetyl peroxide, stearoyl peroxide, acetylbenzoyl peroxide, tertiary butyl hydroperoxide, phthalyl peroxide, succinyl peroxide, crotonyl peroxide, and the like. In addition to azodi-isobutyronitrile, other azo compounds can also be suitably employed. Peroxygen compounds are greatly activated when used in combination with a reducing substance such as sodium sulfite. Such systems are commonly known as a "redox" system. Somewhat faster rates are obtained when the copolymerization is carried out in the presence of a "redox" catalyst or azo compounds. Good results are obtained when between about 0.05 to about 1.5 part of catalyst is used per 100 parts of polymerizable compound.

The polymerization is carried out in a liquid which is immiscible with the polymerizable compounds, i.e., the liquid medium is a non-solvent for the compound or compounds to be polymerized. Water is the preferred suspension medium. The amount of water in which the polymerization is to be effected is preferably maintained between 1.5 to 5 times the amount of polymerizable compounds used. The suspension is agitated or stirred during the polymerization. While the copolymers will settle out on termination of the agitation, the suspension is usually pumped as a slurry for the operation of filtration or centrifugation used to separate the polymers from the aqueous medium. The recovered copolymers can then be washed with water if desired and then dried.

The present process in addition to isobutylene (isobutene) is applicable to other aliphatic monoisoolefins such as 2 methyl-butene-1,2-ethyl-butene-1, and 3 methyl-butene-1. It is desirable that the isoolefin contain less than 8 carbon atoms.

The concentration of mono-isoolefin in the polymerization mixture can be varied considerably. However, concentrations from about one percent to about 50 percent by weight of the polymerization mixture have been found to be most suitable. Mono-isobutylenes enter into copolymer formation, but in lower proportion than represented in the initial monomer mixture. Low conversion copolymers contain less mono-isoolefin than high conversion resins made from the same initial monomer ratios. The resulting copolymers can contain from a few tenths of a percent to about 50 percent of isoolefin depending upon the proportions of original mixture, and the conversions obtained.

Since certain changes may be made in the above process without departing from the scope of the invention herein involved, it is intended that all matter contained in the above description should be interpreted as illustrative and not in a limiting sense.

What is claimed is:

1. The process of producing substantially uniform, large particle size copolymers which comprises copolymerizing a mixture of from about 99% to 50% by weight of vinyl chloride and from about 1% to 50% by weight of a mono-isoolefin having less than 8 carbon atoms at a temperature between about 30° C. and 70° C. and at a pH below about 7.0 while dispersed in an aqueous suspension medium containing an oil-soluble free radical polymerization catalyst, a salt dissolved therein of a polyvalent metal and a surface-active agent selected from the group consisting of the alkali-metal and ammonium salts of organic sulfates and the alkali-metal and ammonium salts of organic sulfonates, said polyvalent metal salt and said surface-active agent each being present in an amount within the range of about 0.02 to 0.20 part per 100 parts of the mixture of polymerizable compounds.

2. The process of producing substantially uniform, large particle size copolymers which comprises copolymerizing a mixture of from about 99% to 50% by weight of vinyl chloride and from about 1% to 50% by weight of a mono-isoolefin having less than 8 carbon atoms at a temperature between about 30° C. and 70° C. and at a pH below about 7.0 while dispersed in an aqueous suspension medium containing an oil-soluble free radical polymerization catalyst, a salt dissolved therein of a metal selected from the group consisting of magnesium, calcium, strontium, zinc, cadmium, barium, aluminum, tin, lead, antimony, titanium, and zirconium and a surface active agent selected from the group consisting of the alkali-metal and ammonium salts of organic sulfates and alkali-metal and ammonium salts of organic sulfonates, said metal salt and said surface active agent each being present in an amount within the range of about 0.02 to about 0.20 part per 100 parts of the mixture of polymerizable compounds.

3. The process of producing substantially uniform large size copolymers of vinyl chloride and isobutylene which comprises copolymerizing a mixture of from 99% to 50% by weight of vinyl chloride and from about 1% to 50% by weight of isobutylene at a temperature between about 30° C. and 70° C. and at a pH below about 7.0 while dispersed in an aqueous suspension medium containing an oil-soluble free radical polymerization catalyst, a salt dissolved therein of a metal selected from the group consisting of magnesium, calcium, strontium, zinc, cadmium, barium, aluminum, tin, lead, antimony, titanium and zirconium and a surface-active agent selected from the group consisting of the alkali-metal and ammonium salts of organic sulfates and the alkali-metal and ammonium salts of organic sulfonates, said metal salt and said surface-active agent each being present in an amount within the range of about 0.02 to about 0.20 part per 100 parts of the mixture of vinyl chloride and isobutylene.

4. The process of claim 3 wherein the polymerization catalyst is an organic peroxide.

5. The process of claim 3 wherein the polymerization catalyst is an azo compound.

6. The process of claim 5 wherein the azo compound is azodi-isobutyronitrile.

7. The process of producing substantially uniform, large particle size copolymers which comprises copolymerizing a mixture of from about 99% to 50% by weight vinyl chloride and from about 1% to 50% by weight of a mono-isoolefin containing less than 8 carbon atoms at a temperature between about 30° C. and 70° C. and at a pH below about 7.0 while dispersed in an aqueous suspension medium containing an oil-soluble free radical polymerization catalyst, a salt dissolved therein of a metal selected from the group consisting of magnesium, calcium, strontium, zinc, cadmium, barium, aluminum, tin, lead, antimony, titanium, and zirconium and an alkali-metal and ammonium salt of an organic sulfate as a surface-active agent, said metal salt and said surface-active agent each being present in an amount within the range of about 0.02 to about 0.20 part per 100 parts of the mixture of polymerizable compounds.

8. The process of producing substantially uniform, large particle size copolymers which comprises copolymerizing a mixture of from 99% to 50% by weight of vinyl chloride and from about 1% to 50% by weight of a mono-isoolefin containing less than 8 carbon atoms at a temperature between about 30° C. and 70° C. at a pH below about 7.0 while dispersed in an aqueous suspension medium containing an oil-soluble free radical polymerization catalyst, a salt dissolved therein of a metal selected from the group consisting of magnesium, calcium, strontium, zinc, cadmium, barium, aluminum, tin, lead, antimony, titanium, and zirconium and an alkali-metal and ammonium salt of an organic sulfonate as a surface-active agent, said metal salt and said surface-active agent each being present in an amount within the range of about 0.02 to about 0.20 part per 100 parts of the mixture of polymerizable compounds.

9. The process of producing substantially uniform large size copolymers of a copolymer of vinyl chloride and isobutylene which comprises copolymerizing a mixture of from 90% to 95% by weight of vinyl chloride and from 10% to 5% by weight of isobutylene at a temperature between about 30° C. and 70° C. and at a pH below about 7.0 while dispersed in an aqueous suspension medium containing an oil-soluble free radical polymerization catalyst, a salt dissolved therein of a metal selected from the group consisting of magnesium, calcium, strontium, zinc, cadmium, barium, aluminum, tin, lead, antimony, titanium and zirconium and a surface-active agent selected from the group consisting of the alkali-metal and ammonium salts of organic sulfates and the group consisting of the alkali-metal and ammonium salts of organic sulfonates, said metal salt and said surface-active agent each being present in an amount within the range of about 0.02 to about 0.20 part per 100 parts of the mixture of vinyl chloride and isobutylene.

References Cited in the file of this patent

UNITED STATES PATENTS

| | | |
|---|---|---|
| 2,479,367 | Joyce et al. | Aug. 16, 1949 |
| 2,520,959 | Powers | Sept. 5, 1950 |
| 2,673,194 | Grim | Mar. 23, 1954 |

FOREIGN PATENTS

| | | |
|---|---|---|
| 570,330 | Great Britain | July 3, 1945 |
| 573,086 | Great Britain | Nov. 6, 1945 |